(12) United States Patent
Davletshin

(10) Patent No.: US 11,702,834 B2
(45) Date of Patent: Jul. 18, 2023

(54) METHOD AND DEVICE FOR CLEANING SEWER PIPELINE

(71) Applicant: Yevgeniy Ruslanovich Davletshin, Orenburg (RU)

(72) Inventor: Yevgeniy Ruslanovich Davletshin, Orenburg (RU)

(*) Notice: Subject to any disclaimer, the term of this patent is extended or adjusted under 35 U.S.C. 154(b) by 744 days.

(21) Appl. No.: 16/493,792

(22) PCT Filed: Jul. 4, 2017

(86) PCT No.: PCT/RU2017/000485
§ 371 (c)(1),
(2) Date: Mar. 11, 2020

(87) PCT Pub. No.: WO2018/169435
PCT Pub. Date: Sep. 20, 2018

(65) Prior Publication Data
US 2021/0131090 A1    May 6, 2021

(30) Foreign Application Priority Data
Mar. 16, 2017   (RU) ............................ RU2017108799

(51) Int. Cl.
*E03F 9/00*    (2006.01)
*B08B 9/045*    (2006.01)
(Continued)

(52) U.S. Cl.
CPC .............. *E03F 9/005* (2013.01); *A46B 13/00* (2013.01); *A46B 13/001* (2013.01); *A46B 13/02* (2013.01);
(Continued)

(58) Field of Classification Search
CPC ......... A46B 15/0026; A46B 2200/3013; E03F 9/002; E03F 9/005; B08B 9/0436; B08B 9/045; B08B 2209/04; B08B 1/002
See application file for complete search history.

(56) References Cited

U.S. PATENT DOCUMENTS

| | | | | |
|---|---|---|---|---|
| 5,235,718 | A * | 8/1993 | Grimsley | B08B 9/045 15/104.095 |
| 5,987,684 | A * | 11/1999 | Evans | E03F 9/005 15/104.31 |
| 6,187,105 | B1 * | 2/2001 | Matlschweiger | E03F 9/005 134/22.12 |

FOREIGN PATENT DOCUMENTS

| | | |
|---|---|---|
| CN | 2586750 Y | 11/2003 |
| EP | 1803505 A1 | 7/2007 |

(Continued)

*Primary Examiner* — Randall E Chin

(57) ABSTRACT

The group of inventions can be used for removal of deposits in sewers and the simultaneous removal thereof in various pipelines, providing mechanization of the cleaning process in a sewage pipeline and eliminating the need for disassembling the drain system and manually cleaning it. A movable element and a cleaning tool mounted thereon, both arranged within the sewage pipeline, are moved along the sewage pipeline by means of a drive mounted outside the sewage pipeline and connected to the movable element. In the initial position, the cleaning tool is located at the end of the sewage pipeline, outside the sewage pipeline portion connecting the drain pipe with a riser. When the cleaning tool reaches the end position at the junction of the sewage pipeline and the riser, the drive and the movable element move the cleaning tool to its initial position.

16 Claims, 4 Drawing Sheets

(51) Int. Cl.
  *B08B 9/043*   (2006.01)
  *B08B 1/00*    (2006.01)
  *A46B 15/00*   (2006.01)
  *F16L 55/28*   (2006.01)
  *A46B 13/00*   (2006.01)
  *A46B 13/02*   (2006.01)
  *F16L 101/12*  (2006.01)

(52) U.S. Cl.
  CPC ...... *A46B 15/0004* (2013.01); *A46B 15/0026* (2013.01); *B08B 1/002* (2013.01); *B08B 9/045* (2013.01); *B08B 9/0436* (2013.01); *E03F 9/002* (2013.01); *F16L 55/28* (2013.01); *A46B 2200/3013* (2013.01); *B08B 2209/04* (2013.01); *F16L 2101/12* (2013.01)

(56) References Cited

FOREIGN PATENT DOCUMENTS

| | | |
|---|---|---|
| RU | 2004365 C1 | 12/1993 |
| RU | 2181867 C2 | 4/2002 |
| SU | 1538935 A1 | 1/1990 |

\* cited by examiner

METHOD AND DEVICE FOR CLEANING SEWER PIPELINE

TECHNICAL FIELD

The invention relates to pipeline cleaning and may be used for removal of deposits in a sewer pipe and the simultaneous removal thereof in various pipelines.

BACKGROUND

From prior art a method and device for cleaning a pipeline with a reflux riser are known, at which driven in rotation via a flexible shaft is subjected to a cleaning tool running along the direction of the longitudinal feed pipe, and simultaneously rinsing water sprayed into the pipe in the direction of draining pressurized wherein the deposition in the pipeline is removed from the opposite direction dripping deposits captured longitudinal feeding, to which a cleaning tool is introduced into the riser pipe below the return stretch and the front side in the feeding direction, wash water is fed into the conduit above the zone of removal and formed as a scraping cutter tool is driven to rotate at a rear side in the feeding direction. The device for cleaning a pipeline with a reflux riser comprises a cleaning tool, which is a mill head connected to the movable element, which is connected with a drive (see Patent RU 2181867, published 27 Apr. 2002 year). The disadvantage of this solution is that it is intended only for cleaning the reverse common (chief) of the riser and is not intended for the purification of the individual (separate, own) diversion of sewage pipelines in separate apartments, private homes, etc. The disadvantage is also the complexity of the equipment and its installation process (assembly), the impossibility of individual use. The closest to the proposed solution is a method for purifying sewage pipelines using sanitary rope is a steel cable, made of a twisted wire having a handle at one end and a brush at the other end. The method using sanitary rope is implemented as follows. Read the siphon at one end with a cable led into the brush tube and perform rotational movements, moving the brush along the pipeline, periodically removed cable and purified from deposits, the cable is removed, is set siphon and washed with hot water system (see, e.g., Internet site http://remoo.ru/kanalizaciyalchem-prochistit-kanalizacionnye-truby-vdomashnih-usloviyah/, http://stroyusnulya.com/kak-prochistit-kanalizatsionnye-truby-v-domashnih-usloviyahmetody.html).

The disadvantage of this solution is the need to drain system disassembly and manual cleaning of sewage that is only available to those skilled in the art, a specialist must spend considerable time on the sewer cleaning. Since the sewage is clogged with a certain frequency, a consumer constantly has to bear the material costs of cleaning already clogged sewer or prophylactic cleaning.

SUMMARY

The technical problem of the group of inventions is to provide an affordable and fast possibility of individual treatment of domestic sewage pipelines by consumers at any time, to increase convenience and quality of elimination of blockages in sewage pipes, to provide opportunities for preventive sewer cleaning, i.e., for maintaining sewage constantly clean. The technical problem of the invention is solved by the method of cleaning a sewage pipeline consisting in that a drive mounted outside of the sewage pipeline is used to move, along the sewage pipeline, a movable element connected to the drive and a cleaning tool mounted thereon, both arranged within the sewage pipeline; in an initial position, the cleaning tool is located at the end of the sewage pipeline outside a plot sewer pipeline connecting a spout to a riser, and when the cleaning tool reaches an end position in a place where the sewer pipeline is connected with the riser, the drive and the movable element are used to move the cleaning tool to its initial position. The drive may be a reversible gear motor. The cleaning tool may be a brush. In addition, the brush can be used, which may be provided with a magnetic element to interact with at least one limit switch mounted on at least one end of the sewer pipe to close drive circuit contacts. Additionally, the drive connected to a control panel may be used. Moreover, the movement of the cleaning tool to the initial position can be performed by means of an elastic member mounted at the end of the sewer pipe and connected to the movable element. A spring may be used as the elastic member. A flexible cable may be used as the movable element, the movement of which can be effected through winding and unwinding the same by means of the drive. Furthermore, a cylindrical spiral may be used as the movable element, the movement of which can be implemented by rotating it around its axis by means of the drive, wherein the cleaning tool can have ridges located between the turns of the cylindrical spiral, which push the ridges while rotating, ensuring displacement of the cleaning tool. Also, the technical problem is solved due to the fact that the device for cleaning the sewer pipeline comprises a drive associated with a movable element on which the cleaning tool is mounted, the drive being configured to reversibly move the movable element, and the cleaning tool being mounted on the movable element to reciprocate.

Moreover, the drive can be configured as a reversible geared motor.

Furthermore, the movable element may be formed as a flexible cable. Furthermore, the device may include a means for self-returning the cleaning tool, with one end of the cable connected to the self-returning means, and the other—to the drive. The means for self-returning the cleaning tool may be configured as a resilient element, such as a spring. Furthermore, the device may comprise at least one roller for installation into a sewage pipeline, to which a cable is connected, both ends of the cable being connected with the drive to be wound in opposite directions. The movable element may be formed as a cylindrical spiral, one end of which is connected with the drive, wherein the cleaning tool has ridges disposed between the turns of the cylindrical spiral to interact therewith. In addition, the cleaning tool can be formed as a brush. The cleaning tool can be provided with a magnetic element for closing contacts of the drive. In addition, the drive may be connected to a control panel by means of at least one communication channel. The control panel may have a manual control mode. Furthermore, the control panel may have a GSM communication unit and may be associated with a mobile device by means of at least one communication channel. In addition, the control panel may be configured for programming. Furthermore, the device may be provided with a water supply means connected with the control panel. The technical result providing a solution of the technical problem is mechanizing the process of cleaning a sewage pipeline, eliminating the need for disassembling the drain system and manually cleaning it, by installing a cleaning tool in the pipeline having an individual drive located outside the sewer pipe and having free access to of its controls.

LIST OF FIGURES

The invention is illustrated by drawings, where FIG. 1 shows the proposed device with the means for self-returning the cleaning tool;

IMPLEMENTATION OF THE INVENTION

Figure 1:
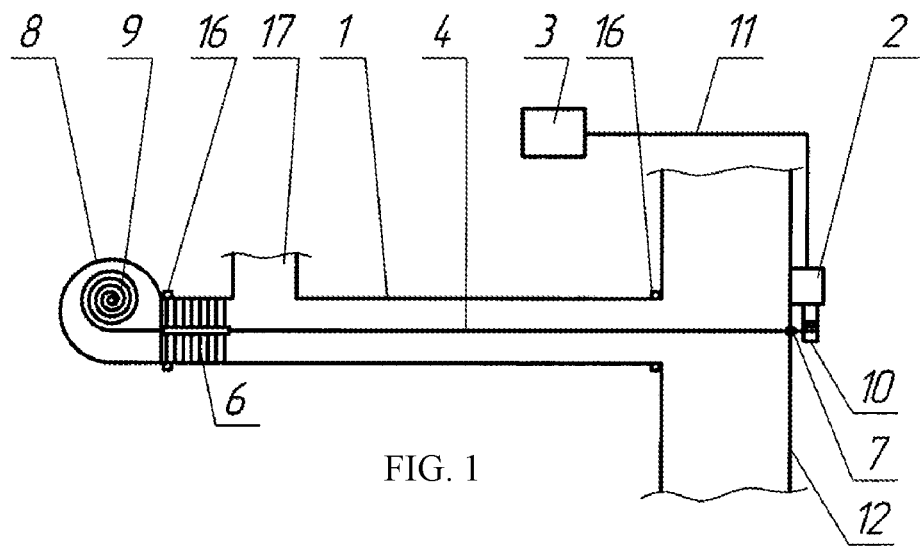

The method and the device for automatically cleaning the sewage pipeline 1 (pipes) are used for cleaning, preferably, individual (separate, own) horizontal shunt (diverting) sewage pipelines 1 (effluents, main branches) communicated with a common (main) riser 12 in separate apartments, private homes, offices, etc. Also, the method and the device can be used for cleaning common risers.

The method for automatically cleaning the sewage pipeline 1 is realized by the device for automatically cleaning the sewage pipeline 1, which includes: a drive 2 (wheel drive), a control panel 3, a movable element 4, rollers 5, a cleaning tool (element) 6. Also, the sewage pipeline 1 cleaning device can also include other means and components shown or not shown in the drawings, but intended for the functioning of the device and the method, e.g., an element (controller, not shown) for communicating the control panel 3 with a mobile device, rubber or other inserts 7 for cleaning the movable element 4, a coil 8 with self-returning by means of an elastic member 9, for example, a spring (spiral or other—a means for self-returning the cleaning tool), etc. The drive 2 is formed as a reversible geared motor, which has an output shaft 10 (drum) and is able to perform reverse movement of the movable element 4. In some embodiments, the drive 2 may not have the output shaft 10. The drive 2 is mounted on the outside of the sewage pipeline 1, the drive 2 can be installed either on the sewage pipeline 1 itself, or on the riser 12, depending on the configuration of a sewer system. A control panel 3 is also mounted outside the sewage pipeline 1, the control panel 3 is linked (coupled) with the drive 2 by one or more wired or wireless channels (lines) 11. The control panel 3 may be configured for programming or be without this possibility, i.e., it may be controlled manually (the control is performed by clicking on the start button (switch) of the drive 2, and it is also possible to forcibly stop the drive via the respective "stop" button on the control panel 3). Also the control panel 3 may have a separate GSM communication unit (not shown) and be connected with a mobile device (not shown) via one or more communication channels (e.g., the Internet). The control panel 3 may be controlled via any mobile device that has Internet access and special software (a mobile application) to control the control panel 3. During operation of the control panel 3 in the manual mode, a user presses the start button of the drive 2 and the sewage pipeline 1 cleaning cycle begins. When the control panel 3 operates in the automatic mode, a program for switching the drive 2 on is set: once a day, or once a week, or once a month, etc. Also the control panel 3 may be associated with a "smart house" system and the cleaning cycle can be run through its overall system, or a cleaning cycle can be started using a mobile device at any time convenient for the user. The movable element 4 can be formed as a flexible cable (metal or other, for example, a line having thickness of one to three millimeters (1-3 mm)), which is positioned inside the sewage pipeline 1 and associated with rollers 5 which are preset and fixed on the inner surface of the sewage pipeline 1. The device may include one or more rollers 5 depending on the length (distance) of the sewage pipeline 1. The cable may be positioned within the sewage pipeline 1 and without using the rollers 5 if the sewage pipeline 1 has a small length and a simple form (without bending). Also, the movable element 4 can be formed as a cylindrical spiral (helical, twisted, spiral element in FIG. 5) formed, for example, of a rigid wire of stainless steel. A cylindrical spiral is disposed within the sewage pipeline 1 along the portion of the drain pipe 17 to the junction of the sewage pipeline 1 with the riser 12. Regardless of the embodiment of the movable element 4 (a flexible cable or a cylindrical spiral), it is associated with the drive 2 to be reversibly moved within the sewage pipeline 1. The cleaning tool 6 is formed as a cylindrical (circular) brush having the shape of the inner surface of the sewage pipeline 1. The cleaning tool 6 is disposed (installed in the initial position) inside the sewage pipeline 1 in its end furthest from the riser 12, outside the sewage pipeline 1 portion (discharging portion) connecting the drain pipe 17 (the last user of the riser) with the riser 12. The cleaning tool 6 is mounted on the movable element 4 with the possibility of reciprocating displacement inside the sewage pipeline 1 along it. In the case of using a cable as the movable element 4, the cleaning tool 6 is rigidly connected with the cable, and in the case of using a cylindrical spiral as the movable element 4, the cleaning tool 6 is associated with the movable element 4 to be moved thereon along the sewage pipeline 1. In the case when the cleaning tool 6 is movable on the movable element 4, the cleaning tool 6 is equipped with a sleeve 13 (a base), which has inner ridges (pins) 14 disposed between the turns of the cylindrical spiral to interact therewith. Also, the cleaning tool 6 is provided with a magnetic element 15 (e.g., a magnetic ring) to interact with limit switches 16 (contact closers), closing contacts of the drive 2 for its reverse motion and stop. Limit switches are mounted at the beginning of the sewage pipeline 1 (in the place of communication with the riser 12), and at the end of the sewage pipeline 1 (in the place of installation of the drive 2). Depending on the distance (the total length), the diameter of the sewage pipeline 1 being serviced, and the form thereof (with or without bending), the following embodiments of mounting elements of the device for cleaning the sewage pipeline 1.

1) FIG. 1. The drive 2 is installed outside the riser 12 communicated with the beginning of the sewage pipeline 1. In the place of setting the drive in the riser 12, a hole is drilled for the cable, an insert 7 is inserted into the hole through which the cable is pulled, the insert 7 tightly compresses the cable. At the end of the sewage pipeline 1, a means for self-returning the cleaning tool (a coil 8 with a spring 9) is installed. One end of the cable, on which the cleaning tool 6 is rigidly mounted is connected (linked) with the spring 9 so that the cleaning tool 6 is located at the end of the sewage pipeline 1 (outside of the drain portion) when the spring 9 is in an unstrained (relaxed) state. The other end of the cable is connected with the output shaft 10 (drum) of the drive 2. The drive 2 is connected to the control panel 3. The device in this case operates as follows. The user presses a control panel 3 button, or sends a command to the control panel 3 via a mobile device, or the control panel 3 automatically gives a start command to the drive 2 according to a predetermined program, this starts the drive 2 and the cleaning cycle begins. The drive shaft 10 rotating in one direction winds the cable thereon, while the cleaning tool 6 rigidly connected to the cable is moved along the sewage pipeline 1, scouring and removing any deposits in the sewage pipeline 1 towards the riser 12. Having reached the riser 12, the cleaning tool 6 dumps all removed deposits into the riser 12. The cable compressed by the insert 7 is wound on the shaft 10 and cleaned of the deposits due to the tight compression. When the cable is wound on the shaft 10, the other end of the cable stretches the spring 9, resulting in its stressed state. When the cleaning tool 6 reaches the beginning of the sewage pipeline 1 (the point of connection to the riser 12, i.e. its end position), a command is sent to the drive 2 (a signal, for example, from the stressed state of the spring or from closing the limit switch 16 on the sewage pipeline 1 by the magnetic element 15, or in any other known way possible) and the shaft 10 of the drive 2 either comes in a neutral position (for free rotation in any direction), or starts to rotate in the opposite direction. The spring 9 begins to contract and pull one end of the cable connected thereto on which the cleaning tool 6 is fixed. The other end of the cable is unwound, and the cleaning tool 6 moves due to the compression of the spring 9 to the initial position (at the end of the sewage pipeline 1). Thus, movement of the cleaning tool 6 to the initial position is carried out by means of the spring 9 connected to the cable. When the cleaning tool 6 reaches its initial position, a signal is supplied to the drive 2 and the cleaning cycle ends, which can be repeated at any time.

Figure 2:
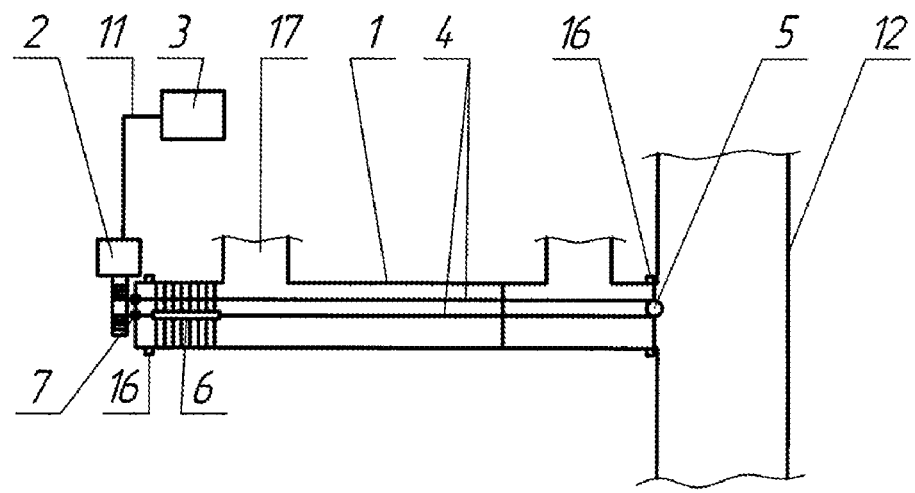
FIGS. 2-4 show the same, without the means for self-returning the cleaning tool, with other methods of mounting the drive.
Figure 3:
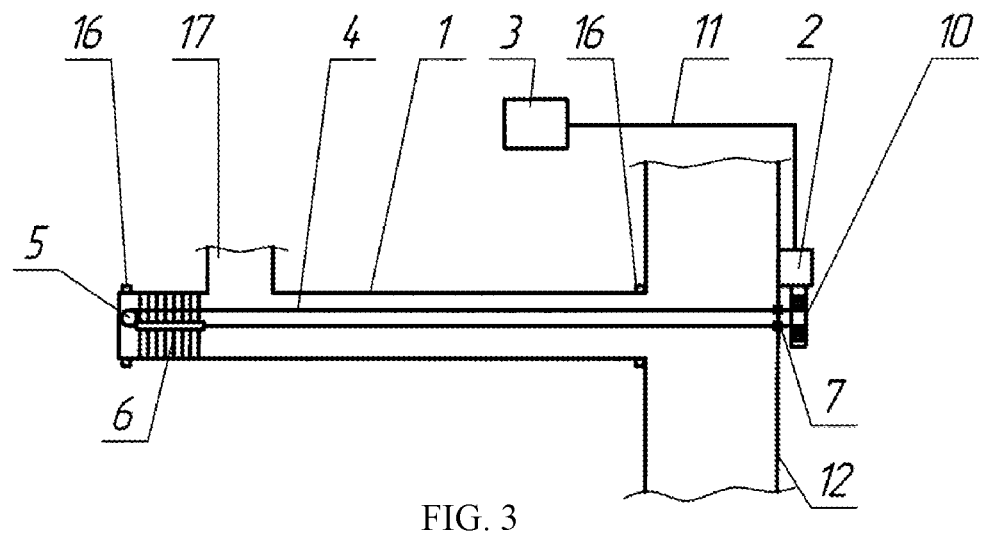

2) It is also possible that the coil 8 is not used, and the cable is pulled along the sewage pipeline 1 and thrown over the roller 5 (connected thereto) mounted within the sewage pipeline 1. In this case, the drive 2 is mounted either at the end of the sewage pipeline 1 (the cable hole is drilled at the site of installation of the drive 2), and the roller 5, over which the cable is thrown, is installed at the beginning of the sewage pipeline 1 (in the place of communication with the riser 12, FIG. 2). Alternatively, the drive 2 is mounted on the riser 12, and the roller 5 is mounted at the end of the sewage pipeline 1 (FIG. 3). In both these cases, both ends of the cable are connected to the shaft 10 of the drive 2 with the possibility of winding the cable on the shaft 10 in opposite directions (opposite winding of the cable ends), and the cleaning tool 6 is mounted at the end of the sewage pipeline 1 outside of the discharging portion. The device in this case operates as follows. The user starts the drive 2 using the control panel 3. The one-way rotating shaft 10 of the drive 2 winds one end of the cable onto itself, the other end of the cable (already opposite wound earlier) being unwound. The cable thrown over the roller 5 and the cleaning tool 6 rigidly installed thereon move along the sewage pipeline 1, scraping off and removing all deposits in the sewage pipeline 1 towards the riser 12. Having reached the riser 12, the cleaning tool 6 dumps all the removed deposits into the riser 12. The cable compressed by the inserts 7 is cleaned of deposits during winding and unwinding on/from the shaft 10 in both directions. When the cleaning tool 6 reaches the endl position (the beginning of the sewage pipeline 1—the place of the communication with the riser 12), the drive 2 is given a command (a signal, for example, from the full unwinding of the cable and its tension, or from closing of the limit switch 16 on the sewage pipeline 1 by the magnetic element 15, or in any other known and possible manner) and the shaft 10 of the drive 2 starts to rotate in the reverse direction. At that, winding of the unwound end of the cable on the shaft 10 begins, the end of the cable wound on the shaft 10 unwinds, and the cleaning tool 6 moves with the cable to its initial position (to the end of the sewage pipeline 1). When the cleaning tool 6 reaches its initial position, a signal is sent to the drive 2 and the cleaning cycle ends, which can be repeated at any time.

Figure 4:
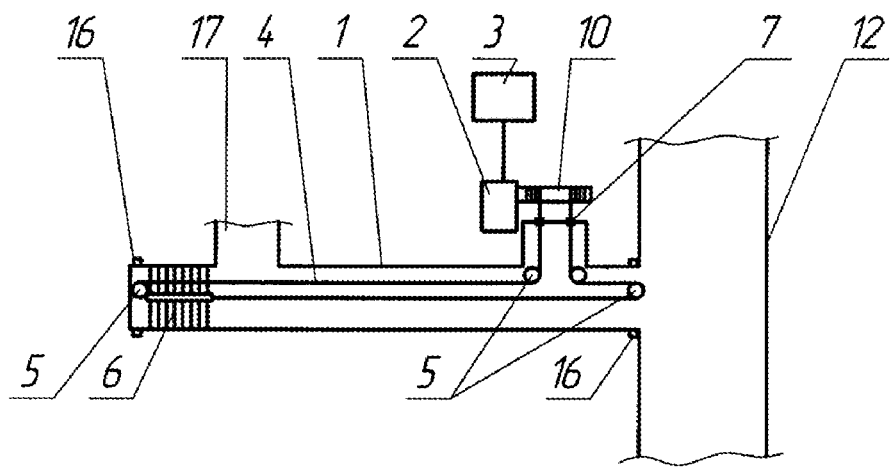

3) FIG. 4. It is also possible to install the device on long distances of the sewer pipes when the cable is drawn along the sewage pipeline 1 and thrown over the rollers 5 which are installed inside the sewage pipeline 1 at its beginning, at the end and also at the place of installation of the drive 2. In this case, the drive 2 is installed either at the beginning of the pipe (in the point of communication with the riser 12), or the drive 2 is installed in the middle of the sewage pipeline 1 or in another section of the sewage pipeline 1, and sewer tees or adapters (not shown) may be used. In these cases, both ends of the cable are coupled to the shaft 10 which can be wound in opposite directions, and the cleaning tool 6 is installed at the end of the sewage pipeline 1. Holes for the inserts 7 are formed in the sewage pipeline 1 or in a T-joint at the place of installation of the drive 2. The device operates in this case as follows. The user starts the drive 2 using the control panel 3. The movement of the cable is carried out by means of its winding and unwinding by means of the drive 2, i.e. the shaft 10 of the drive 2 rotating in one direction winds one end of the cable onto itself, at the same time the other end of the cable (already opposite wound earlier) is unwound. The cable thrown over the rollers 5 and the cleaning tool 6 rigidly installed thereon are moved along the sewage pipeline 1, scraping and removing all deposits in the sewage pipeline 1 towards the riser 12. After reaching the riser 12, the cleaning tool 6 dumps all the removed deposits into the riser 12. The cable compressed by the inserts 7 is cleaned from deposits during winding and unwinding on/from the shaft 10 in both directions. When the cleaning tool 6 reaches the beginning of the sewage pipeline 1 (the place of the communication with the riser 12), a command is sent to the drive 2 (a signal, for example, from the full unwinding of the cable and its tension, or from the closing of the limit switch 16 on the sewage pipeline 1 by the magnetic element 15, or in any other known and possible way) and the shaft 10 of the drive 2 begins to rotate in the opposite direction. At that, the unwound end of the cable starts winding, and the end of the cable wound on the shaft 10 starts unwinding, and the cleaning tool 6 moves with the cable to the initial position (to the end of the sewage pipeline 1). When the cleaning tool 6 reaches its initial position, a signal is sent to the drive 2 and the cleaning cycle ends, which can be repeated at any time.

Figure 5:
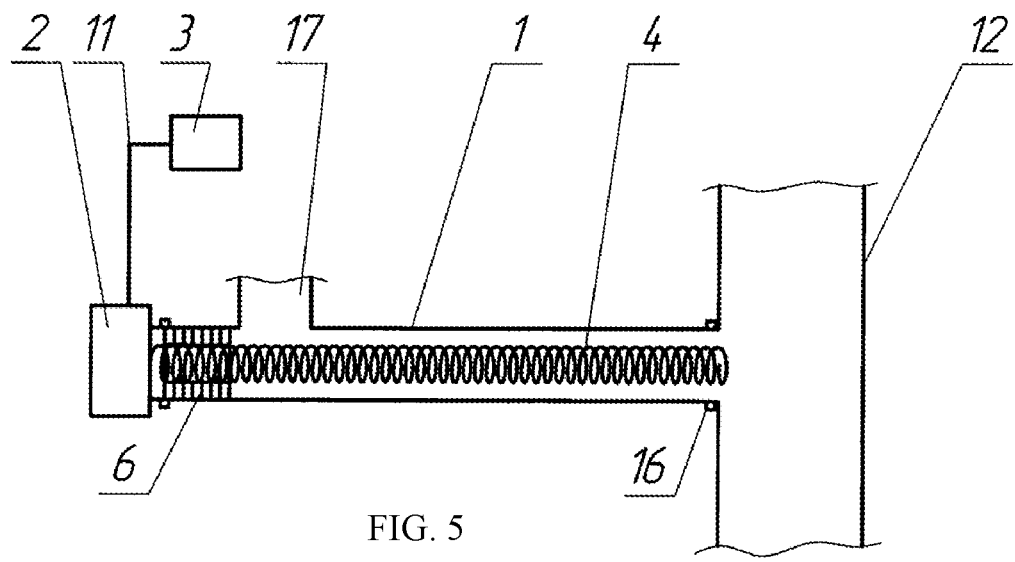
FIG. 5 shows the same, with a spiral movable element.
Figure 6:
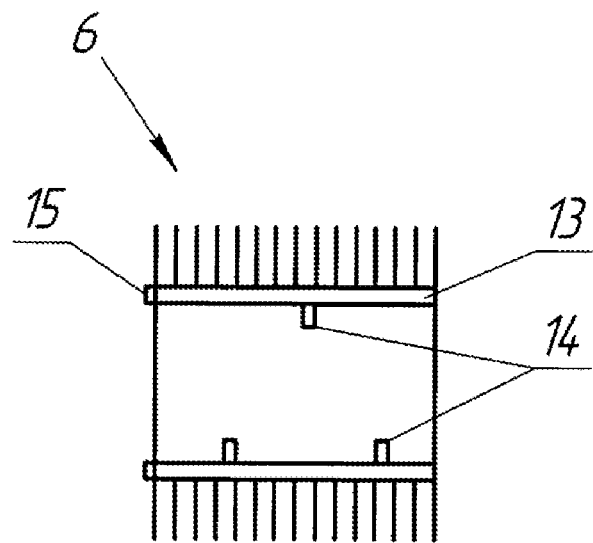
FIG. 6 shows an embodiment of the cleaning tool.
Figure 7:
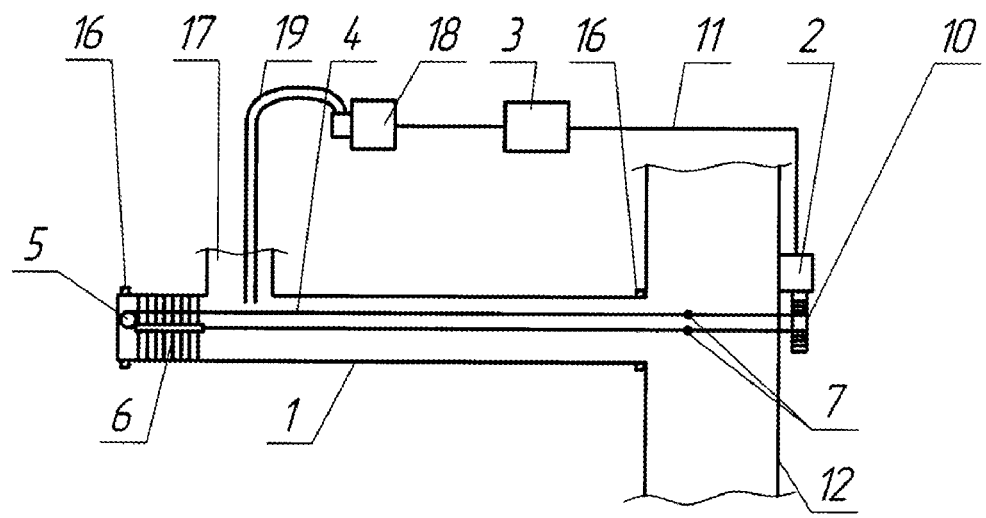
FIG. 7 shows the proposed device with a water supply means.

4) FIG. 5. It is possible to install the drive 2 at the end of the sewage pipeline 1, wherein a longitudinal twisted movable element 4 is used, which is made in the form of a cylindrical spiral which is installed inside the sewage pipeline 1 along its entire length and coaxially therewith. Here, only one end of the spiral is connected to the drive 2, the movement of the spiral being carried out by rotating it in both directions about its axis by the drive 2. The second end of the spiral is fixed on the riser 12, or at the beginning of the sewage pipeline 1, or is not fixed. The cleaning tool 6 in this case is mounted at the end of the sewage pipeline 1 at the point where the spiral is connected to the drive 2. The device operates in this case as follows. The user starts the drive 2 with the help of the control panel 3 and rotates the spiral (element 4). While rotating, the spiral contacts the ridges 14 of the cleaning tool 6 disposed between the spiral turns and pushes the ridges 14 with its turns, and the cleaning tool 6 moves along the sewage pipeline 1, scraping and removing all deposits in the sewage pipeline 1 towards the riser 12. After reaching the riser 12, the cleaning tool 6 dumps all the removed deposits into the riser 12. When the cleaning tool 6 reaches the beginning of the sewage pipeline 1 (the place of communication with the riser 12), a command is sent to the drive 2 (a signal, for example, from the magnetic element 15 closing the limit switch 16 on the sewage pipeline 1, or in any other known and possible manner), and the drive 2 starts rotating the spiral in the reverse direction (the drive 2 is switched off and reverse motion is started). The spiral also pushes the ridges 14 in the reverse direction and the cleaning tool 6 moves to the initial position (to the end of the sewage pipeline 1). When the cleaning tool 6 reaches its initial position, a signal is sent to the drive 2 (e.g. also by closing the limit switch 16) and the cleaning cycle ends, which can be repeated at any time. Thus, when the movable element 4 is rotated in one direction, the cleaning tool 6 is moved along the sewage pipeline 1 from its end to its beginning, which is in communication with the riser 12, and when the cleaning tool 6 is rotated in the other direction, it is moved back to its initial position.

In any of the above-mentioned versions of the installation of the elements of the device for cleaning the sewage pipeline 1, the method of cleaning the sewage pipeline 1 is carried out as follows. By means of the control panel 3 installed outside the sewage pipeline 1, the user drives (switches on) the drive 2 also installed outside the sewage pipeline 1 and connected to the control panel 3 by one or more communication channels 11. After the drive 2 is switched on, it starts to move the movable element 4 connected thereto (moves by means of the rollers 5 and the cable or without them, or rotates the spiral) and the cleaning tool 6 installed on the movable element 4, which are located inside the sewage pipeline 1. The cleaning tool 6 is moved by means of the movable element 4 along the sewage pipeline 1 from the initial position of the cleaning tool 6 to its end position. In the initial position, the cleaning tool 6 is located at the end of the sewage pipeline 1 outside the portion of the sewage pipeline 1 connecting the drain pipe 17 of the end user to the riser 12, and the end position of the cleaning tool 6 is located at the point where the sewage pipeline 1 is connected to the riser 12. When the cleaning tool 6 reaches the end position, the cleaning tool 6 is moved to the initial position by means of the drive 2 and the movable element 4, by reverse rotation of the drive 2 (reverse motion). When the cleaning tool 6 reaches its initial position, the cleaning cycle ends. At all this, the drive 2 is a reversible reduction motor, and the cleaning tool 6 is a brush (a cylindrical brush) which may have a magnetic element 15 for interaction with one or more limit switches 16 mounted on one or both ends of the sewage pipeline 1 and designed to close the contacts of the drive 2 to stop it or to trigger the reversible movement thereof. For the best cleaning of the sewage pipeline 1 from clogs, the device may be provided with a means for supplying water, preferably hot, which includes an automatic valve 18 connected to the control panel 3, and a pipe 19, one end of which is connected to the valve 18 and the other end of which is inserted into the drain pipe 17 at the location of the cleaning tool 6. Actuation of the valve 18 is performed automatically along with starting of the whole cleaning system at pressing the button of the control panel 3, as well as the manual actuation of the valve is possible, also by pressing the start button on the valve 18. When the cleaning tool 6 is moved from its initial position to its end position and back, hot water is supplied into the sewage pipeline 1, which, together with the cleaning tool 6, dumps the clumps formed into the riser 12. Thus, thanks to such implementation and implementation of the group of inventions, it is possible to provide accessible, fast and high-quality cleaning of household sewage pipelines. As a result of implementation of the proposed group of inventions simplifies the entire process of cleaning the pipeline is made easier, which can be carried out at any convenient time for the consumer, without necessarily involving the consumer in the cleaning process, since all elements of the device have stationary arrangement and can be controlled by means of the separate control panel 3. Also, due to the fact that the device has the cleaning tool 6 and its individual drive 2, it is not necessary to always install and remove the device, as well as to use other means of cleaning (chemical or mechanical). As a result of the supply of the sewage system with the proposed cleaning device, which is installed stationarily and does not require constant installation and dismantling, the pipeline cleaning process is completely mechanized, there is no need for partial or complete disassembly of the drain system, and the manual process of pipeline cleaning is completely eliminated. In addition, it is possible to carry out preventive cleaning of pipes from minor clogs at any time, as a result of which the sewer pipeline will never be clogged, which significantly saves both material and time.

The invention claimed is:

1. A method of cleaning a sewage pipeline, comprising: moving, with a drive installed outside a sewage pipeline, a movable element and a cleaning tool, installed thereon, along the sewage pipeline, the movable element and the cleaning tool being located inside the sewage pipeline, wherein, in the initial position, the cleaning tool is located in the end of the sewage pipeline outside the section of the sewage pipeline connecting a drain pipe with a riser; and, when the cleaning tool reaches the final position at the point of connection of the sewage pipeline with the riser by means of the drive and the movable element, moving the cleaning tool to the initial position with a means for self-returning the cleaning tool, said drive allowing reversible displacement of the movable element while the cleaning tool is arranged on the movable element to reciprocate, wherein the movable element is a flexible cable, one end of the flexible cable being connected to the means for self-returning and the other end being connected to the drive.

2. The method of claim 1, wherein the drive is a reversible gear motor.

3. The method of claim 1, wherein the cleaning tool is a brush.

4. The method of claim 3, wherein the brush is equipped with a magnetic element for interaction with at least one limit switch installed on at least one end of the sewage pipeline to close drive contacts.

5. The method according to claim 1, characterized in that the drive is connected to a control panel.

6. The method according to claim 1, characterized in that the flexible cable is moved by winding and unwinding by means of the drive.

7. A device for cleaning a sewage pipeline, comprising a drive, a movable element coupled therewith to support a cleaning tool, a means for self-returning the cleaning tool, said drive allowing reversible displacement of the movable element while the cleaning tool is arranged on the movable element to reciprocate, wherein the movable element is a flexible cable, one end of the cable being connected to the means for self-returning and the other end being connected to the drive.

8. The device of claim 7, wherein the drive is a reversible gear motor.

9. The device according to claim 7, characterized in that the means for self-returning the cleaning tool is in the form of a spring.

10. The device of claim 7, wherein the cleaning tool is a brush.

11. The device of claim 7, wherein the cleaning tool is provided with a magnetic element for closing drive contacts.

12. The device of claim 7, wherein the drive is connected to a control panel via at least one communication channel.

13. The device of claim 12, wherein the control panel has a manual control mode.

14. The device of claim 12, wherein the control panel has a GSM communication unit and is connected to a mobile device by at least one communication channel.

15. The device of claim 12, wherein the control panel is programmable.

16. The device according to claim 12, characterized in that the device is provided with a water supply means connected to the control panel.

* * * * *